(12) United States Patent
Baum et al.

(10) Patent No.: US 7,987,963 B2
(45) Date of Patent: Aug. 2, 2011

(54) CONTAINER FOR TRANSPORTING PIECE GOODS, PARTICULARLY PIECES OF LUGGAGE

(75) Inventors: Ingolf Baum, Dietzenbach (DE); Jörn Brütt, Nürnberg (DE); Thomas Himmel, Rückersdorf (DE); Jürgen Hug, Rodgau (DE); Jaro Kubik, Babenhausen (DE)

(73) Assignee: Siemens Aktiengesellschaft, Munich (DE)

( * ) Notice: Subject to any disclaimer, the term of this patent is extended or adjusted under 35 U.S.C. 154(b) by 24 days.

(21) Appl. No.: 12/593,015

(22) PCT Filed: Mar. 6, 2008

(86) PCT No.: PCT/EP2008/052725
§ 371 (c)(1),
(2), (4) Date: Sep. 25, 2009

(87) PCT Pub. No.: WO2008/116735
PCT Pub. Date: Oct. 2, 2008

(65) Prior Publication Data
US 2010/0101917 A1  Apr. 29, 2010

(30) Foreign Application Priority Data

Mar. 27, 2007 (DE) .................. 10 2007 015 307

(51) Int. Cl.
*B65G 37/00* (2006.01)
(52) U.S. Cl. .............................. 198/370.06; 198/890.1

(58) Field of Classification Search ............. 198/370.06, 198/890.1
See application file for complete search history.

(56) References Cited

U.S. PATENT DOCUMENTS

| | | | |
|---|---|---|---|
| 3,231,068 A * | 1/1966 | Harrison et al. ......... | 198/370.06 |
| 4,781,281 A | 11/1988 | Canziani | |
| 4,884,676 A * | 12/1989 | Suizu ...................... | 198/370.06 |
| 6,253,901 B1 * | 7/2001 | Hintz et al. .............. | 198/370.06 |
| 6,273,268 B1 * | 8/2001 | Axmann .................... | 209/654 |
| 6,866,138 B2 * | 3/2005 | Hug ......................... | 198/457.03 |
| 6,938,750 B2 * | 9/2005 | Miller et al. ............. | 198/370.06 |
| 7,080,725 B2 * | 7/2006 | Hishinuma ............... | 198/370.06 |
| 7,104,387 B2 * | 9/2006 | Brixius et al. ........... | 198/370.06 |

FOREIGN PATENT DOCUMENTS

| | | |
|---|---|---|
| EP | 0990604 A1 | 4/2000 |
| EP | 1041019 A2 | 10/2000 |
| EP | 1362804 A1 | 11/2003 |
| EP | 1452463 A1 | 9/2004 |
| EP | 1464595 A2 | 10/2004 |
| EP | 1609745 A2 | 12/2005 |

* cited by examiner

*Primary Examiner* — Mark A Deuble

(57) ABSTRACT

A loading and unloading station for a container that transports piece goods, particularly pieces of luggage on a conveyor belt is provided. The upper part of the container receiving the piece goods is formed by a storage surface for the piece goods, the surface including an continuous carrying belt spanning the lower part of the container and capable of bearing a load, the carrying belt is arranged transversely to the transport direction of the container and drivably guided around a plurality of deflection rollers provided on both sides of the container. A method for transporting piece goods on a conveyor track including supporting and guide elements for the container is also provided.

18 Claims, 3 Drawing Sheets

CONTAINER FOR TRANSPORTING PIECE GOODS, PARTICULARLY PIECES OF LUGGAGE

CROSS REFERENCE TO RELATED APPLICATIONS

This application is the US National Stage of International Application No. PCT/EP2008/052725, filed Mar. 6, 2008 and claims the benefit thereof. The International Application claims the benefits of German application No. 10 2007 015 307.6 DE filed Mar. 27, 2007, both of the applications are incorporated by reference herein in their entirety.

FIELD OF INVENTION

The invention relates to a container for transporting piece goods, particularly pieces of luggage, on a conveyor track having supporting and guide elements for the container and having at least one unloading station for emptying the piece goods out of the container and/or at least one loading station for loading the container with the piece goods, wherein each container consists of an upper part, which receives the piece goods lying thereon, and a lower part resting on the conveyor track.

BACKGROUND OF INVENTION

In order to transport piece goods of choice, in particular items of luggage such as bags and cases, but also parcels, individually in a loading aid, for example in a container, in a positionally stable manner at high speed over a widely ramified conveying system having many changes of direction and, on the other hand, to bring about a rapid and controlled loading and separation of piece goods and container at predetermined positions within the conveying system, numerous solutions have been described in the prior art. Attempts have been made to design variously shaped containers, particularly in tray form, such that they satisfy the above-described requirements as fully as possible, even though the requirements with respect to the loading aids to be used are high. In particular, flexible and rollable piece goods behave critically.

In the known solutions, the loading is effected in such a way that the piece goods are conveyed from above into the stationary loading aid, for instance the container, in which case they fall in or slide in by force of gravity. A separation of piece goods and container is realized by tilting of the container transversely to the direction of conveyance, whereupon the piece goods slide laterally out of the loading aid under gravitational force.

In addition, active loading aids in the form of autonomous vehicles are known, wherein each vehicle is equipped with its own electrical traction drive, by which it can move in a locally fixedly installed rail system comparable to a railway. The vehicles are equipped with a conveyor track, which is fitted transversely to the direction of conveyance of the loading aid and allows the piece goods to be loaded and discharged at the loading and unloading stations at right angles to the direction of travel. The conveyor track is in this case driven by means of an electric motor fixedly installed on the vehicle, so that an easily controllable and gentle loading/separation of piece goods and container can be achieved. The so-called active loading aid of the described type is very complex and, because of the drive mechanics which are used, also very expensive.

At present, there is widespread use of conveying systems for luggage conveyance purposes, in which relatively simple plastics containers are transported on a conveyor track having supporting and guide elements for the container, which preferably consist of mutually parallel, endlessly rotating belts on which the containers rest. Drawbacks with these systems are the loading and, in particular, unloading devices, which are necessary to tip the piece goods out of the normally gently recessed trays. For this the use of gravitational force is indispensable, which, in turn, leads to the piece goods being subjected to extreme load when removed laterally from the conveying system via chutes, or when thrown into the containers during loading.

From piece goods conveying technology, in particular sorting technology, so-called crossover conveyors are known, which consist of vehicles movable on a conveying system, a plurality of which are combined to form a train or an endlessly rotating vehicle chain, the individual vehicles being provided with a carrying belt, which can be rotatingly driven transversely to the direction of transport of the vehicles. On this carrying belt realized as a crossbelt, the piece items are transported and, at the desired unloading station, laterally discharged by driving of the crossbelt. This type of conveying technology, as a result of the dependency of the individual vehicles upon the laid conveying section, is very limited in its use and cannot be used, for example, in large airport systems involving large distances. Moreover, the individual cars are usually provided with drives, which increase the overall complexity of such a system.

SUMMARY OF INVENTION

The object of the present invention is, starting from the known prior art, to provide an optimally simple and functional system for the transportation and sorting of piece goods, particularly of pieces of luggage, in which, with a low-cost solution, a high reliability and gentle transport of the goods to be transported are achieved.

For the achievement of the object, it is proposed that the upper part of the container, that receives the piece goods, is formed by a bearing surface for the piece goods which spans the lower part of the container with load-bearing capability and is designed as an endless carrying belt, the carrying belt being guided transversely to the direction of transport of the container drivably around deflection rollers disposed on both sides of the container.

The present invention uses the known "tray technology" in which passive containers are transported through the system on a conveyor mechanism and are diverted and controlled by the system. In order to prevent damage to the piece good items and simplify the sorting technology, it is proposed to provide the passive containers with a carrying belt similar to the above-described crossover conveyor technology and to place the piece good items on the endless carrying belt, which forms the top side of the container. Through driving of the carrying belt in the region of the loading and/or unloading station, the piece goods can be laterally removed from the conveying system without gravitational force having to be used.

In order to achieve the discharging of the piece goods from the container, it is necessary to drive the carrying belt. According to one feature of the invention, this is effected not by jointly transported motors as in crossover conveyors, but by virtue of the fact that, for the driving of the carrying belt, in the region of the loading and/or unloading station there is provided a fixed drive, which, at least during the loading and/or unloading process, can be positively or non-positively coupled to at least one drive element for the carrying belt, which drive element is provided on the container.

The invention thus pursues the notion of providing the drive of the passive container only where it is needed, namely in the loading and/or unloading station of the system. There the fixed drive is provided, which there and only there can be coupled to the container such that a transverse motion of the carrying belt is initiated there.

According to one feature of the invention, it is provided that the drive element for the carrying belt is a worm gear drive, the vertically aligned worm shaft of which corresponds with a worm wheel disposed coaxially on one of the deflection rollers and whose friction wheel or gearwheel disposed on the lower end of the worm shaft, in the region of the loading and unloading station, corresponds positively or non-positively with a drive member of the fixed drive, which drive member endlessly rotates parallel to the direction of transport of the container.

The worm shaft used according to the invention has the advantage of self-locking, which ensures that the conveyor track requires no separate braking or locking means to hold the piece goods positionally stable in the loading aid during the transport process. Particularly in the event of changes of direction in the transport process of the containers, forces from the piece goods can impact on the container, which forces, in the absence of locking of the carrying belt, can unintentionally set this in motion and thus shift the piece goods laterally out of the container. The friction wheel or gearwheel on the free end of the worm shaft engages in the loading and/or unloading station an endlessly rotating drive member, which can be configured, for instance, as a chain or belt. In any event, this drive member is designed to rotate endlessly, so that, according to the drive, an influence can be exerted via the worm gear drive on the motional speed and direction of running of the carrying belt.

In the proposed solution, either just one drive element can be provided on one side of the container, preferably on the underside, but it is also conceivable to respectively provide on both sides of the container a drive element which corresponds with respectively an endlessly rotating drive wheel provided on both sides of the longitudinal axis of the container in the region of the loading and/or unloading station.

In a particularly favorable embodiment of the invention, it is provided that the drive element for the carrying belt, which drive element is provided on the container, is configured as a toothed belt rotating parallel to the direction of transport endlessly around deflection pulleys, one deflection pulley of said drive element being operatively connected via an angular gear to one of the deflection rollers of the carrying belt, and which drive element, in the region of the loading and/or unloading station, engages positively in a fixedly disposed, second toothed belt, which can be driven in an endlessly rotating manner parallel to the first toothed belt and the rotation speed and direction of rotation of which are controllable.

This solution is advantageous because the drive transfer from the fixed drive to the container, as a result of the two mutually engaged toothed belts which are used, is better than if a gearwheel or friction wheel is engaged. The toothed belt on the container has a finite length which is sufficient to transmit the drive torque from the fixed toothed belt to the toothed belt provided on the container. At the same time, the toothed belt on the container does not need to reach over the entire side length of the container, as it is guided via two deflection pulleys, one of the deflection pulleys being operatively connected via an angular drive to one of the deflection rollers of the carrying belt. As soon as the toothed belt of the container is set in rotation by external influences, the angular gear is actuated via the deflection pulley of the toothed belt and thus the associated deflection roller is set rotating. As a result, the carrying belt is moved in the direction transversely to the direction of transport of the container and a piece goods item lying thereon can be laterally discharged.

In a preferred embodiment of the invention, it is proposed that the plane of engagement of the first and second toothed belt runs in a common vertical plane. This has the advantage that torque can be transmitted via the toothed belt of the container perpendicularly from below into the angular drive and thus a favorable force transmission into the drive of the carrying belt of the container is obtained.

It is favorable if, between the angular gear and the deflection roller for the carrying belt, a reduction gear is provided to enable the motional speed of the carrying belt to be appropriately controlled. The reduction gear can in the simplest case be a belt transmission, the gear reduction of which is ensured by the different sized belt pulleys.

In order to ensure that both toothed belts, i.e. both of the container and of the fixed drive, enter into engagement and also remain in engagement during the driving of the carrying belts, according to one designed feature of the invention it is proposed to support the engaged strands of the first and second toothed belt on their rear sides against slide bars.

According to the invention, the toothed belts are made of a wear-resistant, highly elastic plastic, and are available in this faun and design on the market. Since the containers move on the conveyor track with tolerances in all directions, it is necessary to ensure that the toothing of the toothed belts allows an appropriate compensation. It is therefore proposed according to the invention that the toothings of the toothed belts are designed to permit tolerances in the direction of the tooth depth.

According to an important feature of the invention, it is provided that the motional direction and the transport speed of the carrying belt in the region of the loading and/or unloading station is controllable via the relative motion of the two mutually engaged toothed belts.

The advantage of controllability is made clear by virtue of the method according to the invention. The method for transporting piece goods, particularly pieces of luggage, on a conveyor track having supporting and guide elements for the container according to one or more of the features of the claims characterized in that:

a) for passage through the loading and unloading stations without loading and unloading of the piece goods, the second, fixed toothed belt rotates at the transport speed of the container and thus without relative speed between the first and the second toothed belt, b) for the unloading of the container to one side of the conveying system, the second, fixed toothed belt rotates at less than the transport speed of the container or remains stationary, c) for the unloading of the container to the other side of the conveying system, the second, fixed toothed belt rotates at a speed greater than the transport speed of the container.

This means that only by appropriate controlling of the fixed toothed belt can the motion of the carrying belt in both directions, and the transport speed thereof, be altered. If the fixed toothed belt rotates at the speed of the container, then even though the toothed belts intermesh, no drive motion of the toothed belt provided on the container takes place, with the result that the carrying belt does not move. As soon as a relative speed between the container and the fixed toothed belt sets in, the carrying belt is driven in accordance with the differential speed more or less rapidly transversely to the direction of transport of the container and any piece goods lying thereon are laterally discharged.

The relative motion of the toothed belts one to another can also of course set in when the container is stationary and the fixed toothed belt is driven, so that the toothed belt of the container is likewise set in motion. The carrying belt can also, as it were, be set in motion during the travel motion of the container, provided that the relative speed to the fixed toothed belt is appropriately chosen. If the fixed toothed belt is driven at a higher speed than the pass-through speed of the container, then the relatively high rotation speed is transmitted to the toothed belt of the container, with the result that the carrying belt is set in motion.

The two solutions of the invention allow a simple loading and unloading of the containers, both during passage or in a stationary state in the loading and/or unloading station by the drive means which are provided there. The containers themselves are not provided with an active drive, but get their drive energy transmitted in the corresponding station from the drive which is provided there. The containers can hence be of relatively simple and low-cost design, without losing the functionality of known crossover conveyors.

BRIEF DESCRIPTION OF THE DRAWINGS

An illustrative embodiment of the invention is provided in the drawing and is described below, wherein.

DETAILED DESCRIPTION OF INVENTION

Figure 1:
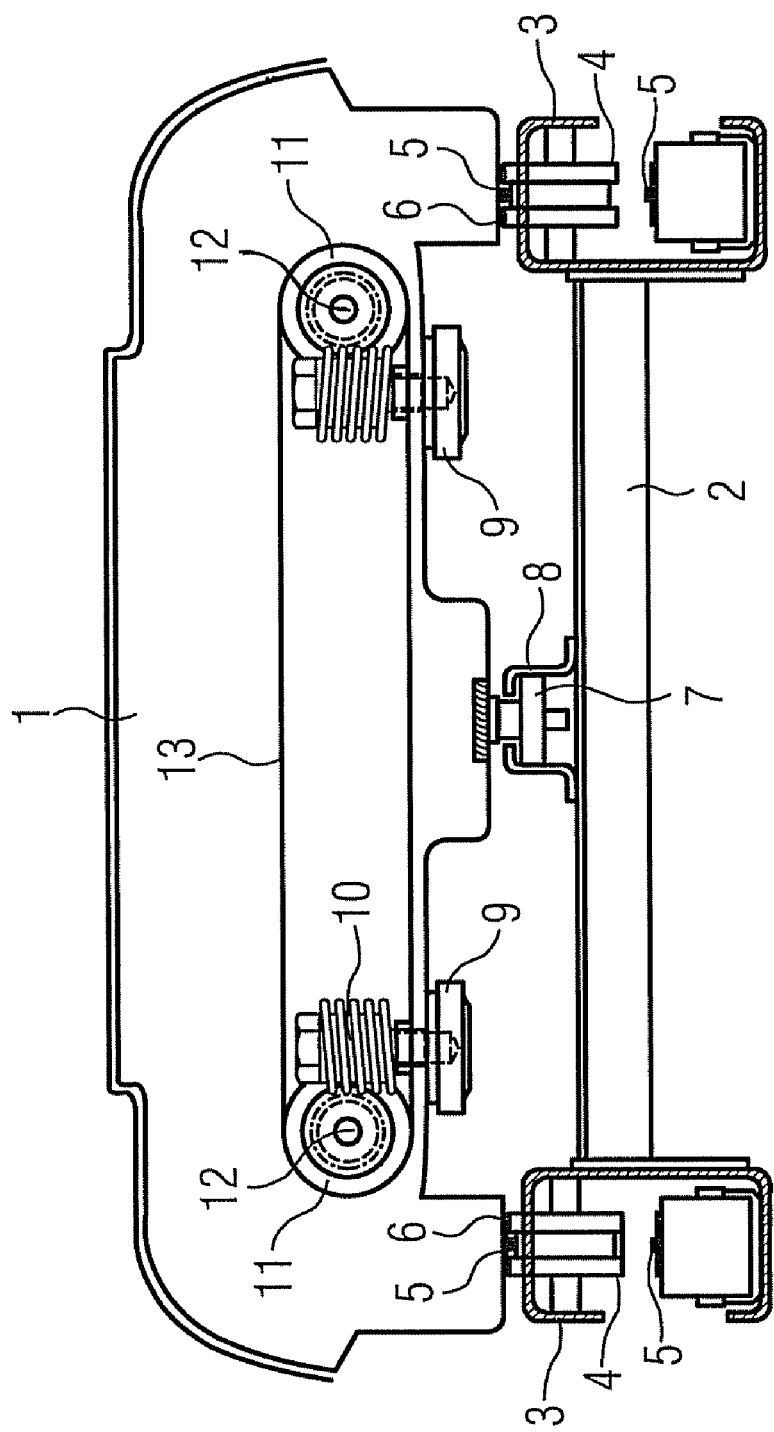
FIG. 1 shows a passive container with worm gear drive.

In FIG. 1, a container according to the invention is denoted by 1, which container is transported on the conveyor track 2. The conveyor track 2 consists of a frame having longitudinal spars 3, in which supporting rollers 4 for two parallel running carrying belts 5 are mounted. The carrying belts 5 are configured as endlessly rotating toothed belts, on whose flat rear sides the container 1 is seated at 6 and is moved via the driven toothed belt 5 in the direction of transport of the conveying system. The container 1 is provided in its longitudinal middle with a perpendicularly downward projecting guide roller 7, which is guided in a guide rail 8 disposed on the frame of the conveyor 2. The container 6 is provided on both sides of its container middle with friction wheels 9, which are fastened in a freely projecting manner on the worm shaft 10. While the friction wheel 9 juts out over the underside of the container 1, the worm shaft 10 projects in the region of the worm wheel 11, which is fastened coaxially on the deflection roller 12 of the carrying belt 13. The friction wheel 9 can respectively be brought in the loading and unloading station into frictional engagement with an endless belt rotating in the direction of transport of the container 1 and parallel thereto, so that the friction wheel 9 can be driven by the belt. According to the speed of the driven belt and according to the rotational direction thereof, the friction wheel 9 is transported in one or the other direction, turning the worm shaft 10, which latter transmits its rotation to the worm wheel 11 and thus to the deflection roller for the carrying belt 13.

Figure 2:
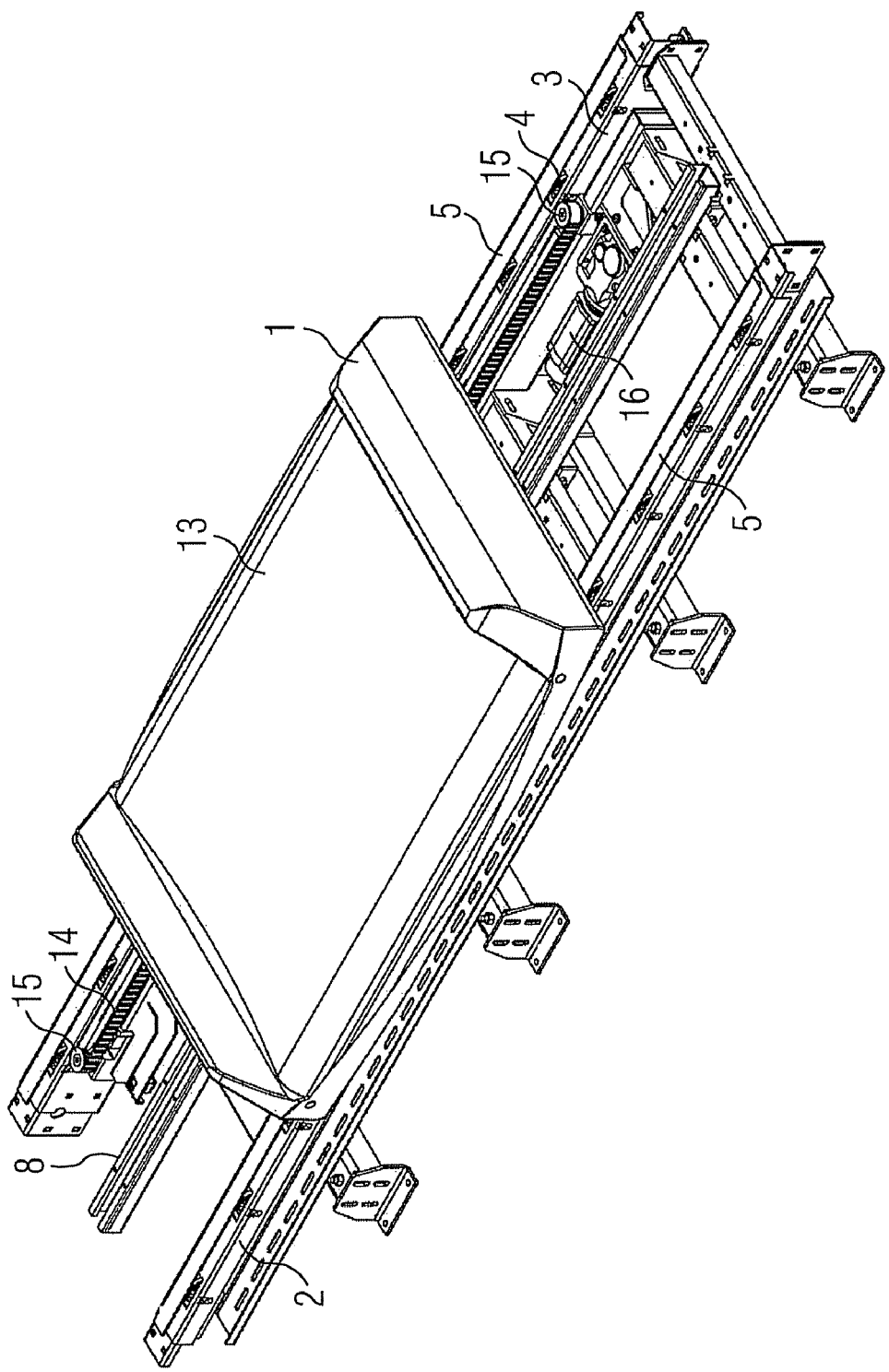
FIG. 2 shows a container according to the invention with toothed belt transmission.

The working of this drive principle can be better illustrated in FIG. 2 on the basis of a modified embodiment. In drawing FIG. 2, a conveying system according to the invention is shown in perspective representation. The container is here too denoted by 1, the carrying belt likewise bearing the position numeral 13. The parallel toothed belts 5, as well as the supporting rollers 4 which are mounted in the longitudinal spars 3 and on which the carrying belts 5 realized as toothed belts are supported, are discernible. As is illustrated with reference to FIG. 1, the container 1 rests on the carrying belt 5 and is here guided with the roller 7 in the guide rail 8. As can be seen in FIG. 2, in a defined region of the frame a drivable toothed belt 14 is disposed parallel to a longitudinal spar 3 of the frame 2. The toothed belt 14 is guided around deflection rollers 15 with vertically aligned rotation axis, one deflection roller 15 (the right-hand one in the drawing) being drivable via a variable-speed motor 16. The length of the toothed belt between the deflection rollers 15 amounts roughly to the loading and/or unloading region of the system, i.e. the region in which the piece goods are intended to be removed from the system. In order to initiate the removal process, the passive drive means are provided, which are explained with reference to FIG. 3.

Figure 3:
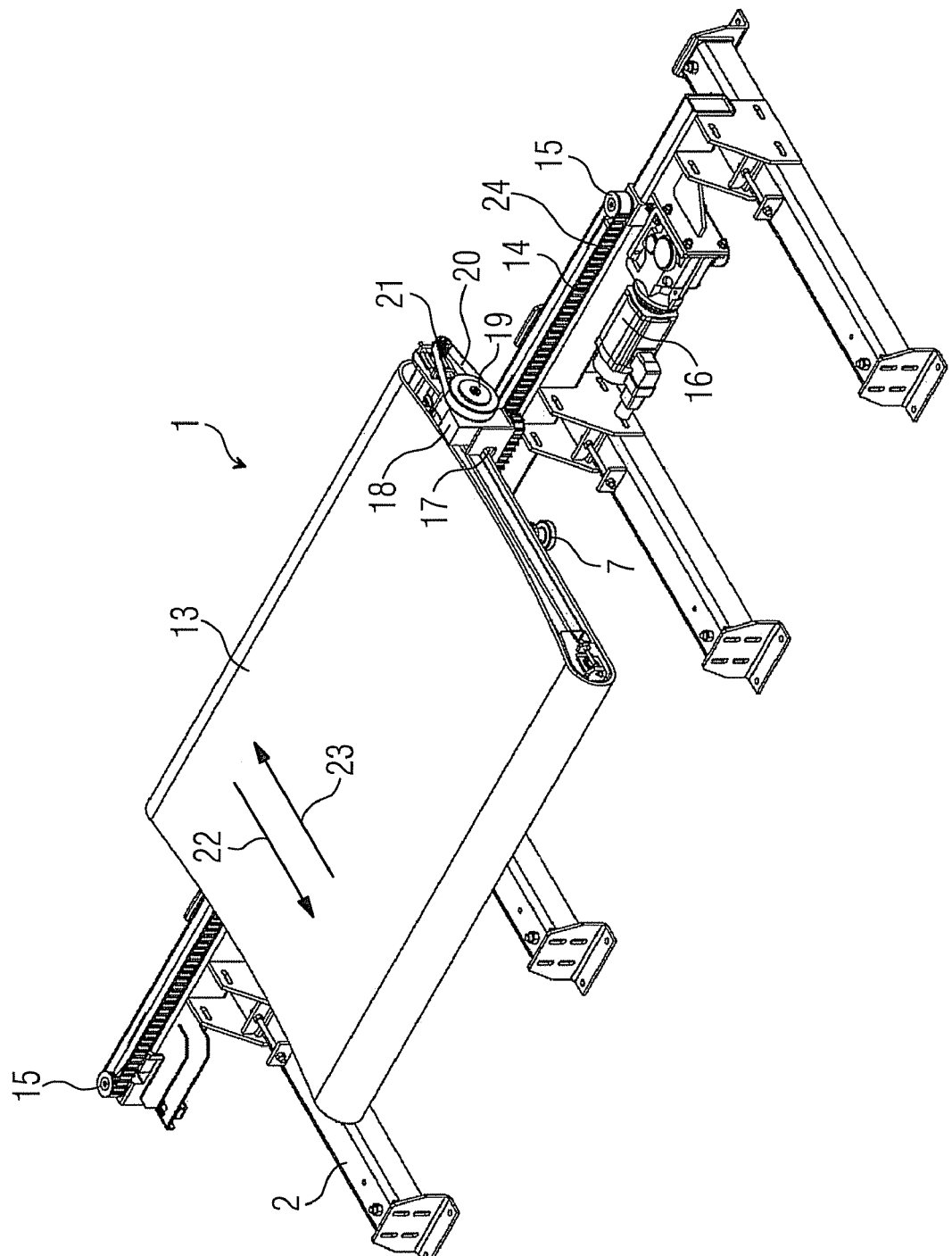
FIG. 3 shows the top part of the container according to FIG. 2.

Same parts are denoted the same in FIG. 3. For better clarity, in FIG. 3 only the upper part of the container is represented, and details of the conveyor are likewise omitted. In the drawing figure, the guide roller 7 on the underside of the container can be seen, though without the guide rail 8, which can be seen, however, in FIG. 2. In the drawing, the fixed toothed belt 14, which is represented guided on the frame 2 of the conveying system around the deflection rollers 15, is similarly discernible, as is a further toothed belt 17, which is guided on the underside of the container 1 around likewise vertically aligned deflection rollers. The toothed belt 17 is, in the loading and/or unloading region of the system, in engagement with the toothed belt 14, i.e. the teeth of both toothed belts interlock and thus create a mutual functional dependency. Via the toothed belt 14, which is driven by the motor 16, the toothed belt 17 of the container 1 can indirectly be driven.

The, in the drawing, front (non-discernible) deflection pulley of the toothed belt 17 reaches with a shaft journal into the angular gear 18, where a 90° deflection of the drive torque onto the belts 19 takes place. From there, the drive torque is transmitted by the V-belt 20 to the belt pulley 21, which, for its part, is fastened on the extended shaft of the supporting roller 13 and drives this, together with the carrying belt 13. In this way, each relative motion to the container 1, induced via the toothed belt 14, is transmitted to the toothed belt 17 disposed thereon, which, for its part, relays the torque, via the gear deflection, to the carrying belt. According to the direction of rotation of the toothed belt 14, a motion of the carrying belt in the directions of conveyance 22 or 23 is obtained; if the rotation speed of the toothed belt 14 corresponds to the transport speed of the container 1, then no relative motion takes place between the toothed belts 14 and 17, and hence no transverse motion of the carrying belt 13 also.

The invention claimed is:

1. A loading and unloading station for a container that transports piece goods on a conveyor track, comprising:
   a plurality of supporting and guide elements for the container;
   an unloading station for emptying the piece goods out of the container; and/or
   a loading station for loading the container with the piece goods,
   wherein the container comprises an upper part, which receives the piece goods lying thereon, and a lower part resting on the conveyor track,
   wherein the upper part of the container is formed by a bearing surface for the piece goods, which spans the lower part of the container,
   wherein the lower part includes a load-bearing capability and is designed as a continuous carrying belt, wherein the carrying belt is guided transversely to a direction of transport of the container drivably around a plurality of deflection rollers disposed on both sides of the container, wherein the carrying belt is driven by a fixed drive, located in a region of the loading and/or unloading station, wherein the fixed drive may be positively or non-positively coupled to a drive element for the carrying belt at least during an loading and/or an unloading process, where the drive element is provided on the container and is a worm gear drive, wherein a vertically aligned worm shaft of the worm gear drive corresponds with a worm wheel disposed coaxially on one of the deflection rollers, wherein a gearwheel of the worm gear drive is disposed on a lower end of the worm shaft, in the region of the loading and unloading station, and corresponds positively or non-positively with a drive member of the fixed drive, and wherein the drive member continuously rotates parallel to the direction of transport of the container, wherein the drive element is provided one each on both sides of the container which corresponds, respectively, to the drive member, and wherein the drive member is provided one each on both sides of a longitudinal axis of the container in the region of the loading and/or unloading station.

2. The loading and unloading station for a container that transports piece goods as claimed in claim 1, wherein piece goods are pieces of luggage.

3. A loading and unloading station for a container that transports piece goods on a conveyor track, comprising:

a plurality of supporting and guide elements for the container;

an unloading station for emptying the piece goods out of the container; and/or a loading station for loading the container with the piece goods, wherein the container corn rises an upper part which receives the piece goods lying thereon, and a lower part resting on the conveyor track, wherein the upper part of the container is formed by a bearing surface for the piece goods, which spans the lower part of the container, wherein the lower part includes a load-bearing capability and is designed as a continuous carrying belt, wherein the carrying belt is guided transversely to a direction of transport of the container drivably around a plurality of deflection rollers disposed on both sides of the container, wherein the carrying belt is driven by a fixed drive, located in a region of the loading and/or unloading station, wherein the fixed drive may be positively or non-positively coupled to a drive element for the carrying belt at least during an loading and/or an unloading process, wherein the drive element is configured as a first toothed belt rotating continuously around a plurality of deflection pulleys, wherein one deflection pulley of the drive element is operatively connected via an angular gear to one of the plurality of deflection rollers, and wherein the drive element, in the region of the loading and/or unloading station, engages positively in a fixedly disposed, second toothed belt, which may be driven in a continuously rotating manner parallel to the first toothed belt and has a rotation speed and a direction of rotation that are controllable.

4. The loading and unloading station for a container that transports piece goods as claimed in claim 3, wherein the planes of engagement of the first toothed belt and the second toothed belt run in a common vertical plane.

5. The loading and unloading station for a container that transports piece goods as claimed in claim 3, wherein between the angular gear and the deflection roller, a reduction gear is provided.

6. The loading and unloading station for a container that transports piece goods as claimed in claim 3, wherein the reduction gear between the angular gear and the deflection roller is a belt transmission.

7. The loading and unloading station for a container that transports piece goods as claimed in claim 3, wherein a plurality of engaged strands of the first toothed belt and the second toothed belt are supported on the respective rear side against a plurality of slide bars.

8. The loading and unloading station for a container that transports piece goods as claimed in claim 3, wherein the first toothed belt and the second toothed belt comprise a wear-resistant, high-strength plastic.

9. The loading and unloading station for a container that transports piece goods, as claimed in claim 3, wherein a plurality of teeth of the first toothed belt and the second toothed belt are designed to permit tolerances in a direction of a tooth depth.

10. The loading and unloading station for a container that transports piece goods as claimed in claim 3, wherein a motional direction and a transport speed of the carrying belt in the region of the loading and/or unloading station is controllable via a relative motion of the mutually engaged first toothed belt and second toothed belt.

11. A method for transporting piece goods on a conveyor track including supporting and guide elements for a container, comprising:

configuring a drive element as a first toothed belt rotating continuously around a plurality of deflection pulleys;

operatively connecting one deflection pulley of the drive element via an angular gear to one of a plurality of deflection rollers;

positively engaging the drive element, in a region of a loading and/or unloading station, in a fixedly disposed, second toothed belt, which may be driven in a continuously rotating manner parallel to the first toothed belt and has a rotation speed and a direction of rotation that are controllable;

providing a reduction gear between the angular gear and the deflection roller;

rotating at a transport speed of the container by the fixed second toothed belt for passage through loading and unloading stations without loading and unloading of the piece goods, and thus there is no relative speed between the first toothed belt and the fixed second toothed belt;

rotating at less than the transport speed of the container or remaining stationary by the second fixed toothed belt for the unloading of the container to one side of a conveying system; and rotating at a speed higher than the transport speed of the container by the fixed toothed belt for the unloading of the container to the other side of the conveying system.

12. The method as claimed in claim 11, wherein the piece goods are pieces of luggage.

13. The method as claimed in claim 11, wherein the container remains stationary during the loading and/or unloading and the second toothed belt is driven in one or the other direction, in accordance with a direction of rotation of the carrying belt.

14. The method as claimed in claim 11, wherein the reduction gear between the angular gear and the deflection roller is a belt transmission.

15. The method as claimed in claim 11, wherein a plurality of engaged strands of the first toothed belt and the second toothed belt are supported on the respective rear side against a plurality of slide bars.

16. The method as claimed in claim 11, wherein the first toothed belt and the second toothed belt comprise a wear-resistant, high-strength plastic.

17. The method as claimed in claim 11, wherein a plurality of teeth of the first toothed belt and the second toothed belt are designed to permit tolerances in a direction of a tooth depth.

18. The method as claimed in claim 11, wherein a motional direction and a transport speed of the carrying belt in the region of the loading and/or unloading station is controllable via a relative motion of the mutually engaged first toothed belt and second toothed belt.

* * * * *